US012494585B2

(12) United States Patent
Menargues Gomez et al.

(10) Patent No.: US 12,494,585 B2
(45) Date of Patent: Dec. 9, 2025

(54) CORRUGATED PASSIVE RADIOFREQUENCY DEVICE SUITABLE FOR AN ADDITIVE MANUFACTURING METHOD

(71) Applicant: SWISSto12 SA, Renens (CH)

(72) Inventors: Esteban Menargues Gomez, Preverenges (CH); Santiago Capdevila Cascante, Renens (CH); Tomislav Debogovic, Chexbres (CH)

(73) Assignee: SWISSto12 SA, Renens (CH)

( * ) Notice: Subject to any disclaimer, the term of this patent is extended or adjusted under 35 U.S.C. 154(b) by 123 days.

(21) Appl. No.: 18/556,416

(22) PCT Filed: Apr. 21, 2022

(86) PCT No.: PCT/IB2022/053737
§ 371 (c)(1),
(2) Date: Oct. 20, 2023

(87) PCT Pub. No.: WO2022/224190
PCT Pub. Date: Oct. 27, 2022

(65) Prior Publication Data

US 2024/0186709 A1 Jun. 6, 2024

(30) Foreign Application Priority Data

Apr. 21, 2021 (FR) ................................. FR2104131

(51) Int. Cl.
*H01Q 13/02* (2006.01)

(52) U.S. Cl.
CPC ............................... *H01Q 13/0208* (2013.01)

(58) Field of Classification Search
CPC .. H01Q 13/0208; H01Q 13/0283; H01P 1/211
See application file for complete search history.

(56) References Cited

U.S. PATENT DOCUMENTS

| | | | |
|---|---|---|---|
| 3,274,603 | A | 9/1966 | Kay |
| 4,012,743 | A | 3/1977 | Maciejewski |
| 4,472,721 | A | 9/1984 | Morz |

(Continued)

FOREIGN PATENT DOCUMENTS

| | | | | |
|---|---|---|---|---|
| CN | 105071045 A | * 11/2015 | | ............. H01Q 13/02 |
| KR | 20180055489 A | 5/2018 | | |

OTHER PUBLICATIONS

Peverini Oscar A. et al., Selective Laser Melting Manufacturing of Microwave Waveguide Devices; Proceeds of the 1EEE, 1EEE, New York, US. vol. 105, No. 4, Apr. 1, 2017; pp. 620-631.

(Continued)

*Primary Examiner* — Hoang V Nguyen
(74) *Attorney, Agent, or Firm* — McDonald Hopkins LLC

(57) ABSTRACT

A corrugated passive radiofrequency device, in particular a waveguide or horn-type antenna. The device includes a core including at least one inner face delimiting a channel for filtering and guiding waves. The at least one internal face of the channel includes a plurality of cavities or grooves. Each cavity or groove is formed by substantially parallel adjacent walls to filter the waves passing through the channel. The adjacent walls are inclined with respect to the central axis of the channel.

8 Claims, 3 Drawing Sheets

(56) References Cited

U.S. PATENT DOCUMENTS

| | | | |
|---|---|---|---|
| 2010/0308938 | A1 | 12/2010 | Padilla et al. |
| 2012/0000849 | A1 | 1/2012 | Fassbender |

OTHER PUBLICATIONS

The International Search Report issued in corresponding International PCT Application No. PCT/IB2022/053737; Mailing Date: Jul. 25, 2022.

Notice of Prelimianry Rejection in corresponding KR Application No. 10-2023-7036411 dated Dec. 10, 2024.

* cited by examiner

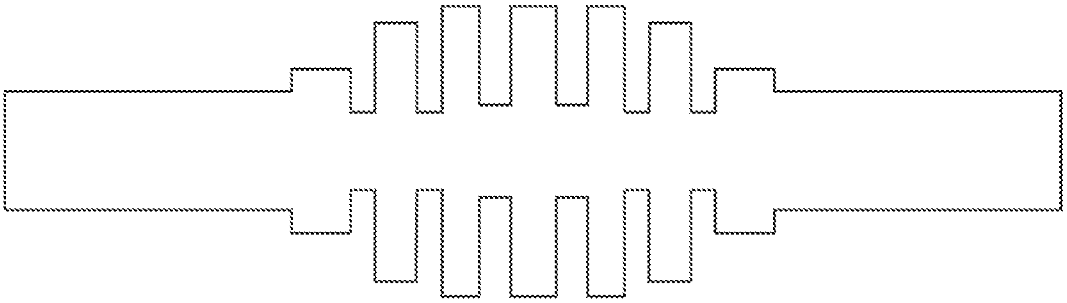
Fig. 1 – Prior art
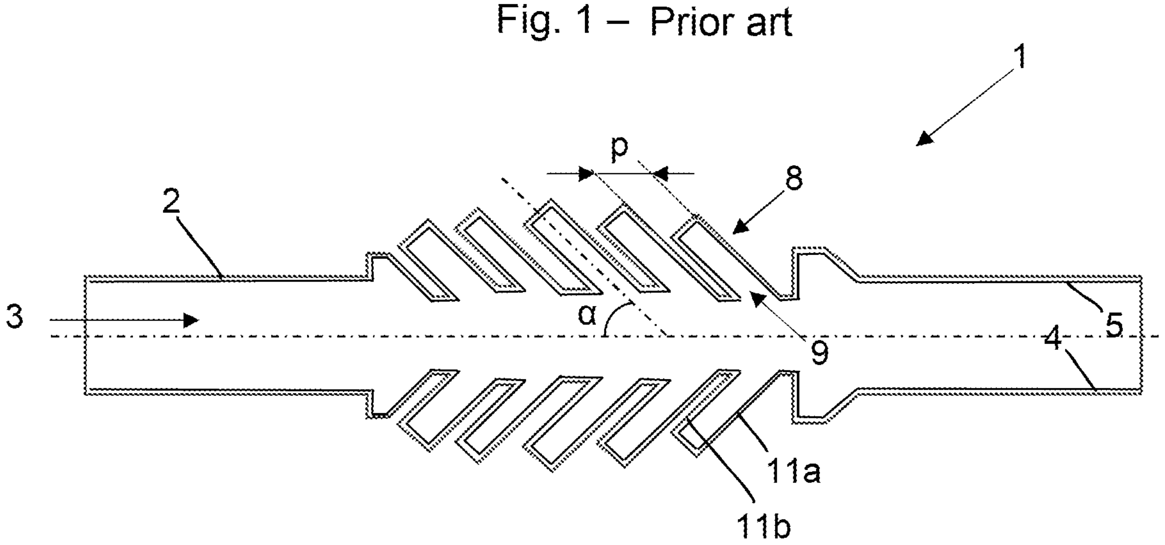
Fig. 2
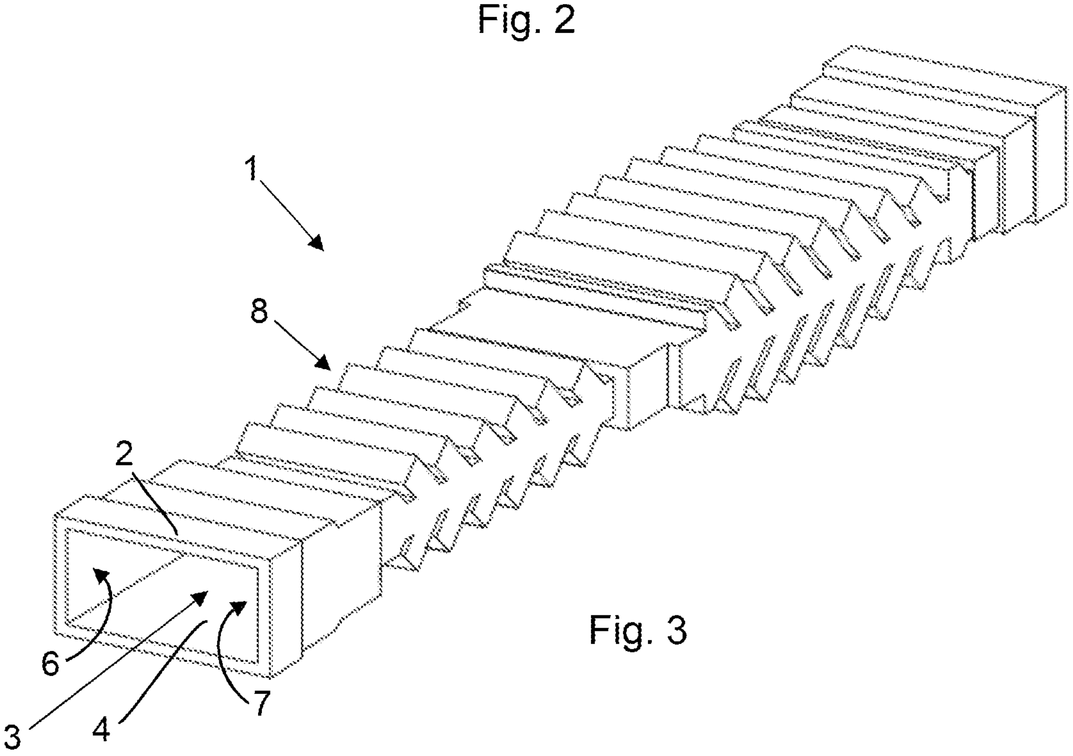
Fig. 3

CORRUGATED PASSIVE RADIOFREQUENCY DEVICE SUITABLE FOR AN ADDITIVE MANUFACTURING METHOD

This application claims priority from French patent application No FR2104131 of Apr. 21, 2021, the contents whereof are entirely incorporated.

TECHNICAL FIELD

The present invention relates to a passive radio frequency device and in particular to a corrugated waveguide filter or a corrugated horn-type antenna suitable for an additive manufacturing process.

BACKGROUND ART

Passive radio frequency devices are used to propagate or manipulate radio frequency signals without using active electronic components. Passive radiofrequency devices include for example passive waveguides based on guiding waves inside hollow metal channels, filters, antennas, mode converters, etc. Such devices can be used for signal routing, frequency filtering, signal separation or recombination, transmission or reception in or from free space, etc.

There is a wide range of different types of waveguide filter. For example, undulated waveguide filters, also known as ridged or corrugated waveguide filters, have a channel with a number of ridges, or teeth, which periodically reduce the internal height of the waveguide. They are used in applications that simultaneously require a wide bandwidth, good bandwidth matching and a wide stopband. They are essentially low-pass designs, unlike most other shapes, which are generally band-pass. The distance between the teeth is much smaller than the typical λ/4 distance between elements in other filter types.

By way of example, US2010/308938 describes a corrugated waveguide consisting of a rectangular-shaped metal guide. The waveguide comprises on two opposite walls a first, respectively a second series of corrugations extending along the waveguide according to a sinusoidal profile facing each other. The first and second series of corrugations act as rejection elements.

The above waveguides of conductive material can be manufactured by extrusion, bending, cutting, electroforming, for example. The production of waveguides with complex cross-sections, in particular corrugated waveguide filters, by these conventional manufacturing methods is difficult and expensive.

However, recent work has demonstrated the possibility of producing waveguides, including filters, using additive manufacturing methods. In particular, the additive manufacture of waveguides formed from conductive materials is known.

Waveguides comprising walls made of non-conductive materials, such as polymers or ceramics, manufactured by an additive method and then covered with a metal plating have also been proposed. For example, US2012/00849 proposes making waveguides using 3D printing. To this end, a non-conductive plastic core is printed by an additive method and then covered with a metal plating by electroplating. The internal surfaces of the waveguides must be electrically conductive in order to operate.

The use of a non-conductive core makes it possible, on the one hand, to reduce the weight and cost of the device and, on the other hand, to implement 3D printing methods adapted to polymers or ceramics and making it possible to produce high-precision parts with low wall roughness.

The state of the art also includes waveguides with a metal core produced by 3D printing. In this case, additive manufacturing allows great freedom in the shapes that can be produced.

Additive manufacturing is typically carried out in successive layers parallel to the cross-section of the filter, so that the longitudinal axis of the opening through the waveguide is vertical during printing. This arrangement makes it possible to guarantee the shape of the aperture, and to avoid the deformation that would occur as a result of the collapse of the upper wall of the aperture before curing in the case of printing in a different direction.

Some waveguide filters, in particular waveguide filters with resonant cavities (corrugated waveguide filter), however, due to their shape, are difficult to manufacture by additive manufacturing methods. This is because attempts to manufacture the filter using an additive manufacturing process have revealed that certain parts of the waveguide filter can be cantilevered, in particular the cavity walls or teeth of corrugated waveguide filters. These cantilevered parts can therefore collapse under gravity during the manufacturing process.

It is therefore necessary to interrupt the additive manufacturing process during the manufacturing process in order to add reinforcements so as to ensure the stability of the structure to be printed, which can be complicated and tedious and can have a significant impact on the speed and control of the manufacture of this type of filter by additive methods.

The document "Selective Laser Melting Manufacturing of Microwave Waveguide Devices", Peverini O. et al., Proceedings of the IEEE, Vol. 105, No. 4, Apr. 1, 2017, discloses a waveguide filter provided with lateral cavities suitable for additive manufacturing.

U.S. Pat. No. 3,274,603A discloses a microwave horn antenna provided with concentric corrugations. The orientation of the corrugations of this antenna with respect to the inner surface of the horn makes additive manufacturing difficult, if not impossible.

U.S. Pat. No. 4,012,743A discloses a parabolic antenna whose horn can include concentric corrugations. Again, the orientation of the corrugations of this antenna with respect to the inner surface of the horn makes additive manufacturing difficult, if not impossible.

U.S. Pat. No. 4,472,721A discloses an antenna with a horn comprising concentric corrugations. Again, the orientation of this antenna's corrugations relative to the horn's inner surface makes additive manufacturing difficult, if not impossible.

An aim of the present invention is therefore to provide a corrugated passive radio frequency device that is better suited to an additive manufacturing process.

BRIEF SUMMARY OF THE INVENTION

This aim is achieved by means of a corrugated passive radiofrequency device comprising a core including at least one internal face delimiting a channel for filtering and guiding the waves. Said at least one internal face of the channel comprises a plurality of cavities or grooves. Each cavity or groove is formed by substantially parallel adjacent walls in order to filter the waves passing through the channel. The adjacent walls of each cavity or groove are inclined with respect to the central axis of the channel.

According to one embodiment, the core comprises a plurality of internal faces. Two opposing inner faces each comprise said plurality of cavities.

In one embodiment, said adjacent walls forming the cavities or grooves are inclined at an angle of between 20° and 55° to the central axis of the channel.

In one embodiment, the angle is between 40° and 50° to the central axis of the channel, preferably at an angle of 45°.

In one embodiment, the inclination of adjacent walls forming a cavity or groove is substantially identical to each other.

In one embodiment, the inclination of adjacent walls forming a cavity or groove is identical to the inclination of adjacent walls forming any other cavity or groove.

In one embodiment, the periodicity of the cavity distribution with respect to the central axis of the radiofrequency device is constant.

In one embodiment, the periodicity of the cavity distribution with respect to the central axis of the radiofrequency device is variable.

In one embodiment, the depth of the cavities relative to one another is constant or variable.

In one embodiment, the radiofrequency device is a waveguide.

In one embodiment, the radiofrequency device is a horn-type antenna.

In one embodiment, the adjacent walls forming the annular grooves are inclined at a second angle of between 30° and 80° to an internal surface of the antenna.

In one embodiment, the adjacent walls forming the annular grooves are circular walls arranged on a conical inner surface. The diameter of the annular grooves changes monotonically or non-monotonically along the central axis.

In one embodiment, the periodicity of adjacent annular grooves with respect to the central axis of the antenna is constant.

In one embodiment, the periodicity of adjacent annular grooves with respect to the central axis of the antenna is variable.

In one embodiment, the circular walls are of constant thickness relative to one another.

In one embodiment, the circular walls vary in thickness from one another.

In one embodiment, the depth of the annular grooves relative to one another is constant or variable.

In one embodiment, the adjacent walls forming the annular grooves are rounded in the direction of the antenna's central axis.

BRIEF SUMMARY OF THE FIGURES

Examples of implementation of the invention are shown in the description illustrated by the appended figures in which:

FIG. 1 illustrates a schematic view of a longitudinal section of a corrugated waveguide filter according to the state of the art, FIG. 2 illustrates a schematic view of a longitudinal section of a corrugated waveguide filter according to one embodiment of the invention;

FIG. 3 illustrates a perspective view of a corrugated waveguide filter according to another embodiment of the invention.

EXAMPLE(S) OF EMBODIMENTS OF THE INVENTION

Figure 4:
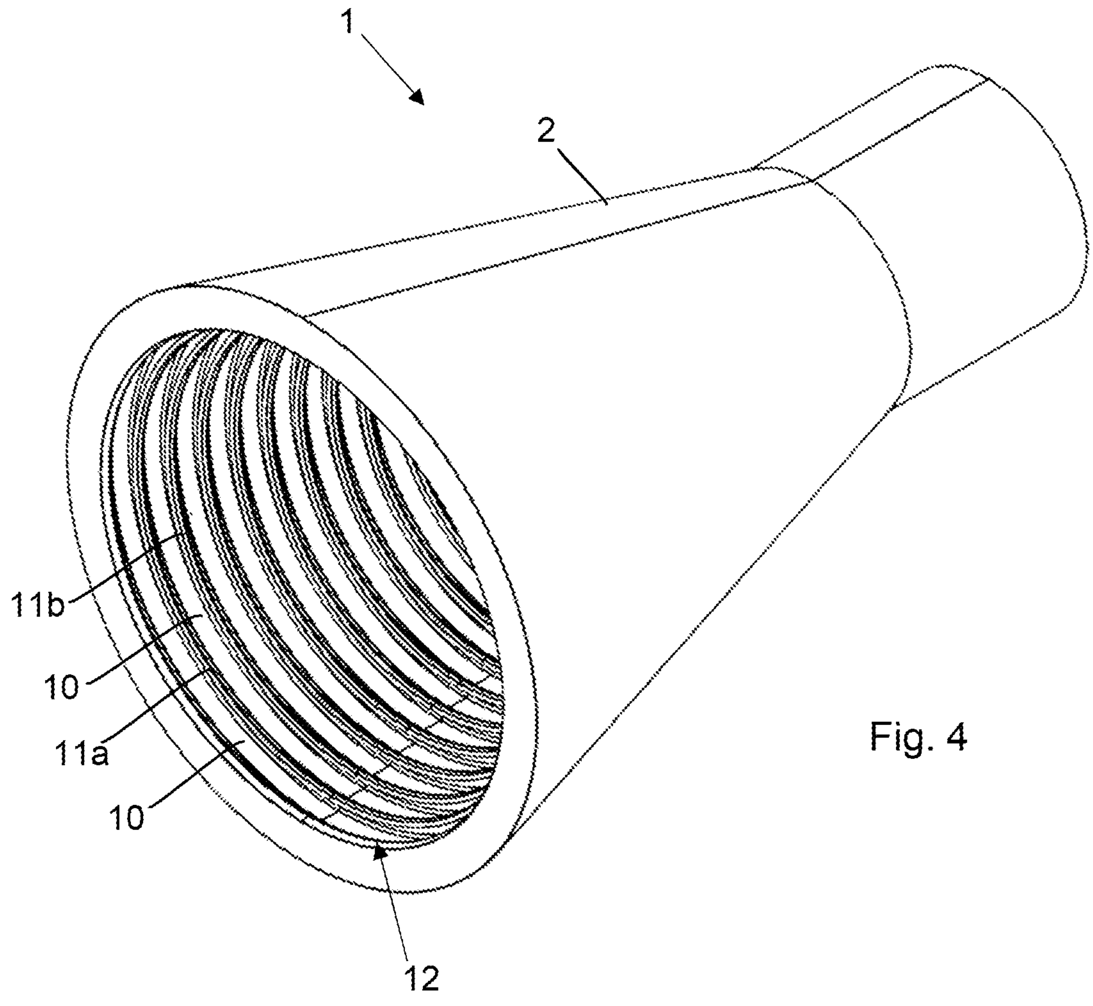
FIG. 4 illustrates a perspective view of a corrugated horn antenna according to another embodiment of the invention.

In one embodiment, the corrugated passive radiofrequency device is a waveguide filter 1, which can take various forms, for example as shown in FIGS. 2 and 3. The filter comprises a core 2 including a plurality of inner faces 4, 5, 6, 7 which delimit a channel 3 configured to filter an electromagnetic signal according to a predefined passband and operating band. For example, the filter is designed to pass a narrow bandwidth within a frequency range of the order of 1 GHz-80 GHz.

The core 2 comprises an outer face including a plurality of extensions 8, the shape of which resembles, for example, straight prisms, each with substantially parallel adjacent walls 11*a*, 11*b*, extending in a plane inclined to the central axis of the channel 3. According to FIG. 2, these straight prisms are hollow so as to form a plurality of resonance cavities 9 extending along the channel 3 in order to filter high-frequency signals in a determined frequency range.

The adjacent walls 11*a*, 11*b* of each extension 8 are inclined to the longitudinal axis of the channel 3. The core 2 of the waveguide filter shown in FIG. 3, for example, comprises a plurality of inner faces 4, 5, 6, 7 (also see FIG. 2). Two opposing inner faces 4, 5 each comprise a first, respectively a second plurality of cavities 9.

The adjacent walls 11*a*, 11*b* forming the cavities 9 are inclined at an angle α of between 20° and 55° to the central axis of the channel 3. The angle α is preferably between 40° and 50° relative to the axis of channel 3, for example 45°.

The inclination of adjacent walls 11*a*, 11*b* of the waveguide filter forming a cavity 9 is substantially identical to each other and to adjacent walls 11*a*, 11*b* of any other cavity. The inclination between cavity-forming walls may, however, vary relative to the inclination of the walls of other cavities in one embodiment.

Furthermore, the periodicity p of the distribution of the cavities 9 with respect to the central axis of the channel 3 of the waveguide 1 is constant or can be variable according to a variant of execution. The depth of the waveguide 1 cavities 9 relative to one another may be constant or variable.

Figure 5:
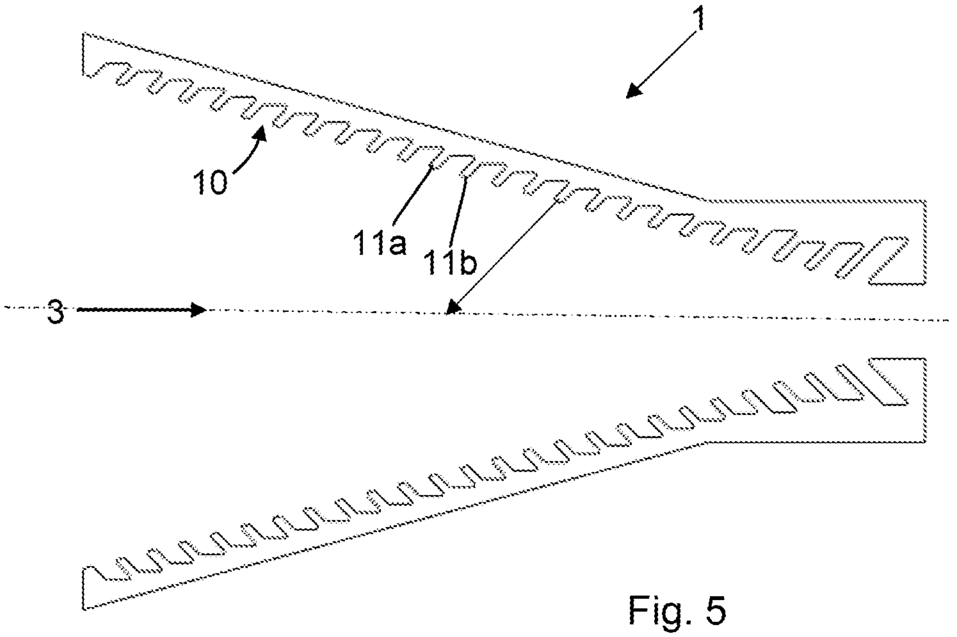
FIG. 5 shows an axial section of FIG. 4.
Figure 6:
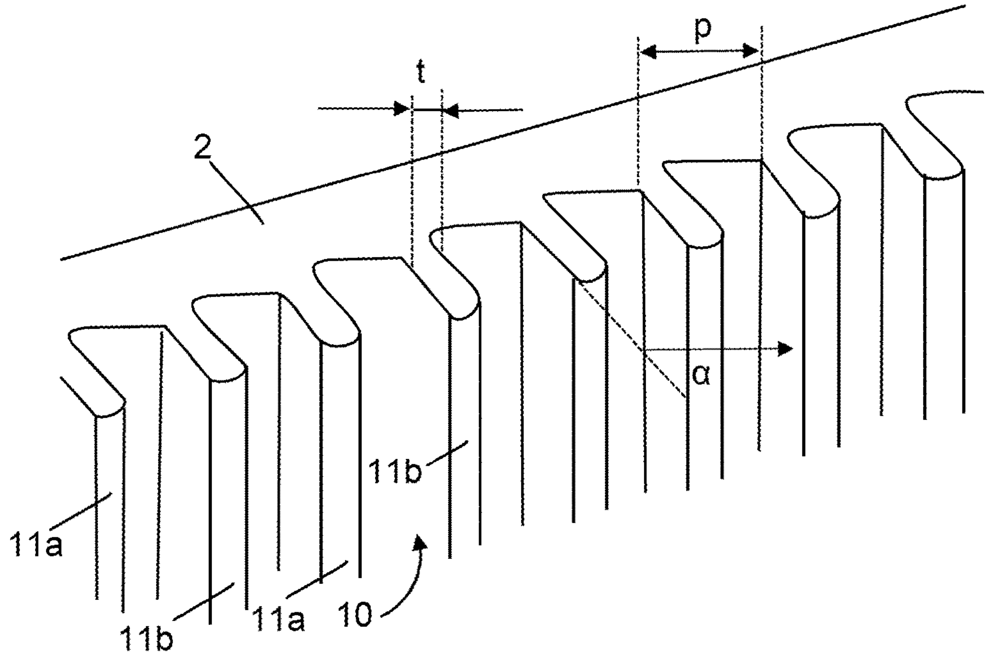
FIG. 6 shows a partial view of the inner surface of the horn antenna shown in FIG. 4, and FIGS. 7*a*, 7*b* and 7*c* show schematically an axial cross-section of a horn antenna with different core profiles.

According to another embodiment illustrated in FIGS. 4 to 6, the corrugated passive radiofrequency device is a horn-type antenna 1. The antenna comprises a core 2 with a conical inner surface 12. A plurality of circular walls 11*a*, 11*b* extend from the conical surface towards the central axis of the antenna 1 and are adjacent to form a plurality of annular grooves 10. These annular grooves are concentric with the central axis of the antenna 1, the diameter of each annular groove 10 being different from the diameter of an adjacent annular groove.

According to FIG. 6, the circular walls 11*a*, 11*b* forming the annular grooves 10 are inclined at an angle α of between 20° and 55° to the central axis of the antenna. The angle α is preferably between 40° and 50° to the longitudinal axis of the channel 3, for example 45°.

Furthermore, the inclination of adjacent circular walls 11*a*, 11*b* forming an annular groove 10 is substantially identical to each other and to the adjacent walls 11*a*, 11*b* of any other annular groove. The inclination between circular walls forming an annular groove may, however, vary with respect to the inclination of the walls of other annular grooves according to a variant of execution.

As illustrated in FIG. 5, the circular walls 11*a* and 11*b* forming the annular grooves can also be inclined at an angle of less than 90° to the inner surface of the horn antenna. In one embodiment, this angle is between 30° and 80°.

On the one hand, this inclination makes it possible to influence the antenna's bandwidth spectrum. On the other hand, this inclination facilitates additive manufacturing of the antenna. Cantilevered surfaces such as the adjacent walls forming the annular grooves are difficult to produce without the use of supports during manufacture, which must then be removed. By inclining the adjacent walls forming the annular grooves with respect to the inner surface of the antenna horn, stresses on the cantilever faces are reduced and the need for supports during manufacture is avoided.

Depending on the opening angle of the antenna horn, the adjacent walls forming the annular grooves can thus be inclined both with respect to the central axis of the antenna by an angle of between 20° and 55°, and with respect to the surface of the antenna horn by an angle of between 30° and 80°. This inclination both in relation to the central axis of the antenna and in relation to the inner surface of the horn minimizes stresses due to cantilevered parts during additive manufacturing.

The periodicity p of adjacent annular grooves with respect to the central axis of the antenna 1 is constant or variable.

The circular walls may have the same thickness t in relation to each other, or different thicknesses. The depth of the annular grooves relative to each other is constant or variable.

Figure 7A:
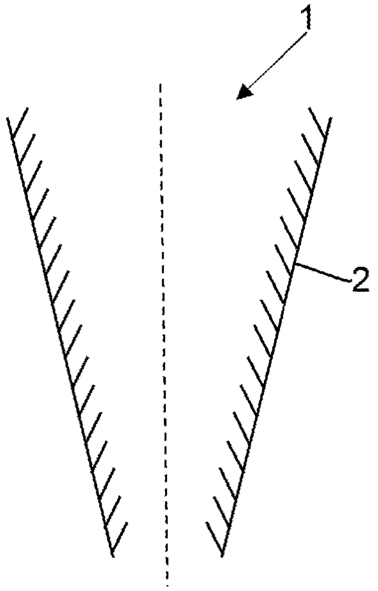
Figure 7B:
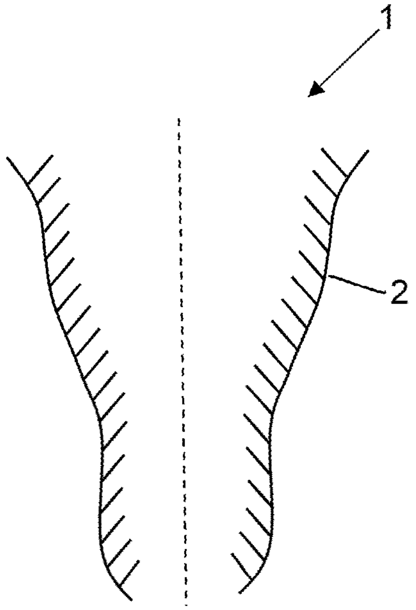
Figure 7C:
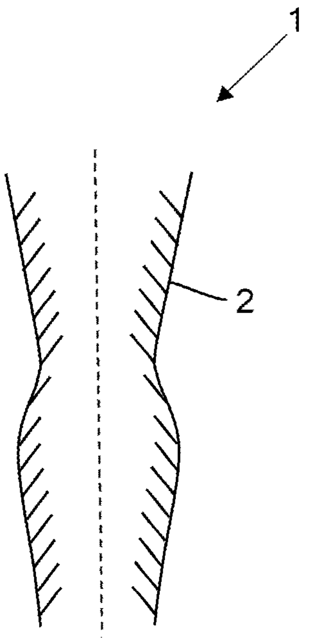

According to other embodiments illustrated by FIGS. 7*a*, 7*b*, 7*c*, the horn antenna 1 may have a core 2 whose profile varies along the central axis in an arbitrary manner. For example, the profile of the antenna core according to FIGS. 7*a* and 7*b* varies along the central axis according to a monotonic function, whereas the profile of the antenna core according to FIG. 7*c* varies along the central axis according to a non-monotonic function.

In the embodiment shown in FIG. 7*a*, the angle between the adjacent walls forming the annular grooves and the central axis of the antenna is constant along the length of the antenna, and the angle between the adjacent walls and the surface of the antenna horn is also constant.

In the embodiments illustrated in FIGS. 7*b* and 7*c*, the angle between the adjacent walls and the central axis of the antenna is constant along the length of the antenna, whereas the angle between the adjacent walls and the surface of the horn varies as the profile of the antenna changes along the central axis.

For example, the geometric shape of the core 2 can be determined by computer software as a function of the desired bandwidth. The calculated geometric shape can be stored in a computer data medium.

The core 2 is manufactured using an additive manufacturing process. In the present application, the expression "additive manufacturing" refers to any process for manufacturing core 2 by adding material, according to computer data stored on the computer medium and defining the geometric shape of the core 2.

The core 2 can, for example, be manufactured by an additive manufacturing process of the SLM (Selective Laser Melting) type. The core 2 can also be manufactured by other additive manufacturing methods, such as liquid or powder curing or coagulation, including but not limited to methods based on stereolithography, binder jetting, DED (Direct Energy Deposition), EBFF (Electron Beam Freedom Fabrication), FDM (Fused Deposition Modeling) PFF (Plastic Free Forming), aerosol, BPM (Ballistic Particle Manufacturing), SLS (Selective Laser Sintering), ALM (Additive Layer Manufacturing), polyjet, EBM (Electron Beam Melting), photopolymerization, etc.

The core 2 may, for example, be made of a photopolymer produced by several surface layers of liquid polymer cured by ultraviolet radiation in an additive manufacturing process.

Core 2 can also be formed from a conductive material, e.g. a metallic material, by an additive manufacturing process of the SLM type, in which a laser or electron beam melts or sinters several thin layers of a powdery material.

In one embodiment, a metal layer (not shown) is deposited as a film by electroplating or galvanoplasty on the inner surfaces 4, 5, 6, 7 of the core 2. Metallization allows to cover the inner faces of the core 2 with a conductive layer.

The application of the metal layer may be preceded by a surface treatment step on the inner faces 4, 5, 6, 7 of the core 2 to promote adhesion of the metal layer. The surface treatment may involve increasing the surface roughness and/or depositing an intermediate bonding layer.

Conventional additive manufacturing processes are not, however, particularly well-suited to conventional waveguide filters, especially corrugated waveguide filters which feature a number of cavities as shown in FIG. 1, since the arrangement of these cavities creates cantilevered portions outside the channel, which are difficult to maintain when printing the individual strata. Reinforcements for these cantilevered portions must therefore be placed during the additive manufacturing process to prevent these parts from collapsing under the effect of gravity.

According to one aspect, and in order to remedy this drawback, the waveguide 1 is printed with the longitudinal axis z of the channel 3 in a vertical, or at least substantially vertical, position.

The geometrical configuration of the waveguide filter 1 according to this example has the advantage of enabling the core 2 to be produced by an additive manufacturing process in a vertical direction opposite to gravity, without having to resort, during the manufacturing process of the core 2, to any reinforcement intended to avoid a collapse of part of the core under the effect of gravity. Indeed, preferably, the angle $\alpha$ of the cantilevered extensions to the horizontal is sufficient to allow the superimposed layers to adhere before they harden during printing.

It is also possible to produce a waveguide with an elliptical or oval cross-section.

In an embodiment illustrated in FIG. 6, the adjacent walls 11*a* and 11*b* forming the annular grooves are rounded in the direction of the antenna 3 axis. In particular, this rounding facilitates additive manufacturing of these cantilever elements.

What is claimed is:

1. Corrugated passive radiofrequency device including a core comprising at least one internal face delimiting a channel for filtering and guiding waves, the said at least one internal face of the channel comprising a plurality of cavities or annular grooves, each cavity or each annular groove being formed by substantially parallel adjacent walls in order to filter the waves passing through the channel, wherein the radiofrequency device is a horn-type antenna, wherein said adjacent walls are inclined with respect to the central axis of the channel, and wherein said adjacent walls forming the annular grooves are inclined at a second angle of between 30° and 80° with respect to an internal surface of the antenna.

2. Passive radiofrequency device according to claim 1, wherein said adjacent walls forming the annular grooves are circular walls which are disposed on a conical inner surface, the diameter of the annular grooves changing along the central axis of the channel in a monotonic or non-monotonic manner.

3. Passive radiofrequency device according to claim 2, wherein the circular walls have the same thickness with respect to each other.

4. Passive radiofrequency device according to claim 2, wherein the circular walls have a thickness which is different from one another.

5. Passive radiofrequency device according to claim 1, wherein a periodicity of the adjacent annular grooves with respect to the central axis of the channel is constant.

6. Passive radiofrequency device according to claim 1, wherein a periodicity of the adjacent annular grooves with respect to the central axis of the channel is variable.

7. Passive radiofrequency device according to claim 1, wherein a depth of the annular grooves relative to one another is constant or variable.

8. Passive radiofrequency device according to claim 1, wherein said adjacent walls forming the annular grooves are rounded in the direction of the central axis of the channel.

* * * * *